US012195231B2

(12) United States Patent
Apostolides

(10) Patent No.: US 12,195,231 B2
(45) Date of Patent: Jan. 14, 2025

(54) MODULAR CONTAINER AND SYSTEM INCLUDING SAME

(71) Applicant: RPM INDUSTRIES, LLC, Washington, PA (US)

(72) Inventor: John K. Apostolides, Wexford, PA (US)

(73) Assignee: RPM INDUSTRIES, LLC, Washington, PA (US)

( * ) Notice: Subject to any disclaimer, the term of this patent is extended or adjusted under 35 U.S.C. 154(b) by 411 days.

(21) Appl. No.: 17/232,781

(22) Filed: Apr. 16, 2021

(65) Prior Publication Data

US 2021/0325278 A1 Oct. 21, 2021

Related U.S. Application Data

(60) Provisional application No. 63/011,121, filed on Apr. 16, 2020.

(51) Int. Cl.
*F01M 11/04* (2006.01)
*B65D 21/02* (2006.01)
*G01N 1/14* (2006.01)

(52) U.S. Cl.
CPC ......... *B65D 21/0231* (2013.01); *F01M 11/04* (2013.01); *G01N 1/14* (2013.01)

(58) Field of Classification Search
CPC ........... F01M 11/04; F01M 2011/0483; F01M 11/0458; B65D 2205/00
See application file for complete search history.

(56) References Cited

U.S. PATENT DOCUMENTS 2,258,019 A 10/1941 Kramer et al.
2,273,737 A * 2/1942 Snyder ............... B60K 15/0406
137/39

(Continued)

FOREIGN PATENT DOCUMENTS

DE 19816295 A1 1/1999
WO WO-2019170914 A1 * 9/2019

OTHER PUBLICATIONS

International Search Report and Written Opinion of the International Searching Authority for PCT/US2021/027724 mailed Jul. 19, 2021, 12 pages.

*Primary Examiner* — Timothy P. Kelly
(74) *Attorney, Agent, or Firm* — K&L Gates LLP

(57) ABSTRACT

A modular container is disclosed. The modular container includes a housing defining an internal cavity configured to contain a contents, a port configured to selectively allow the contents to enter and exit the internal cavity, and a vent configured to allow particles of a predetermined size to enter and exit the internal cavity when the modular container is oriented in a first position. The valve is further configured to prevent the contents from exiting the internal cavity when the modular container is oriented in a second position. The modular container also includes a mechanical interlock system which includes a first interlock element and a second interlock element, wherein the first interlock element is configured to mechanically engage with a corresponding second interlock element of a separate modular component, and wherein the second interlock element is configured to mechanically engage with a corresponding first interlock element of a separate system component.

8 Claims, 16 Drawing Sheets

(56) References Cited

U.S. PATENT DOCUMENTS

| | | | | |
|---|---|---|---|---|
| 3,387,749 | A | * | 6/1968 | Godshalk ............ B65D 21/0231 |
| | | | | 220/768 |
| 3,831,817 | A | * | 8/1974 | Leccese ................. B65D 25/40 |
| | | | | 222/143 |
| 4,656,840 | A | | 4/1987 | Loofbourrow et al. |
| 5,064,101 | A | * | 11/1991 | Richter .............. B65D 21/0231 |
| | | | | 141/351 |
| 5,242,072 | A | | 9/1993 | Koebernik |
| 5,249,684 | A | * | 10/1993 | Sterett ................ B65D 21/0215 |
| | | | | 220/23.6 |
| 5,427,202 | A | | 6/1995 | Behring et al. |
| 6,029,858 | A | | 2/2000 | Srokose et al. |
| 7,175,498 | B2 | | 2/2007 | Garpow |
| 8,985,366 | B2 | | 3/2015 | Barth |
| 10,245,941 | B2 | | 4/2019 | Koukan |
| 10,690,026 | B2 | * | 6/2020 | Goodier ................ F01M 11/04 |
| 10,697,336 | B2 | * | 6/2020 | Dawson ................ F16N 19/003 |
| 2008/0011667 | A1 | * | 1/2008 | Ruschke ............... F16K 15/144 |
| | | | | 210/450 |
| 2009/0016855 | A1 | | 1/2009 | Hofmeister et al. |
| 2010/0052293 | A1 | | 3/2010 | Brooks et al. |
| 2013/0048759 | A1 | | 2/2013 | Aguilar et al. |
| 2016/0369597 | A1 | | 12/2016 | Robertson et al. |
| 2017/0217634 | A1 | * | 8/2017 | Hendrickson ...... B65D 21/0231 |
| 2018/0362227 | A1 | * | 12/2018 | Scanish ..................... B65D 1/20 |
| 2019/0112106 | A1 | * | 4/2019 | Malin ..................... B65D 51/16 |
| 2023/0031435 | A1 | * | 2/2023 | Apostolides ............ B60P 3/225 |

\* cited by examiner

MODULAR CONTAINER AND SYSTEM INCLUDING SAME

CROSS-REFERENCE TO RELATED APPLICATIONS

This application claims the benefit under 35 U.S.C. § 119(e) of the earlier filing date of U.S. Provisional Patent Application No. 63/011,121 filed on Apr. 16, 2020, titled MODULAR CONTAINER AND SYSTEM INCLUDING SAME, the contents of which are hereby incorporated by reference in their entirety.

BACKGROUND

Mechanical systems typically require a variety of fluids for proper operation, depending on the specific application of the system itself. For example, most engines require at least some form of oil to ensure suitable lubrication and minimize friction and wear. More complex systems might require a variety of fluids specifically tailored for each subassembly of the mechanical system, such as transmission and/or brake fluid. Compressible fluids might be used by a mechanical system to create hydraulic power. Still other systems might require specific conditions for optimal performance, thereby requiring the used fluids to maintain those conditions within a predetermined range. For example, a system might require a coolant to maintain an operating temperature within a specified range. Indeed, fluids are ubiquitously implemented throughout mechanical systems in seemingly infinite ways.

It is important to periodically monitor the use of a mechanical system and replace its various fluids in accordance with manufacturer recommendations. Ideally, used fluids can be sampled, filtered and analyzed to acquire a comprehensive understanding of system status and performance. Such maintenance is critical to ensure safe operation and preserve system life. Unfortunately, many fluids used by mechanical systems are either toxic or become carcinogenic when used, thereby necessitating proper containment and disposal. This becomes difficult if the mechanical system is immobile or otherwise inaccessible. For example, industrial, construction, earth-moving, marine, power generation where generators are located on rooftops, in basements of buildings, in hospitals, etc. and transportation systems might be implemented in the field and are too cumbersome to be relocated for routine maintenance. Thus, a servicing technician might be consigned to removing and transporting fluids and ancillary equipment a substantial distance using inappropriately designed containers, thereby endangering themselves, the equipment, and the environment.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
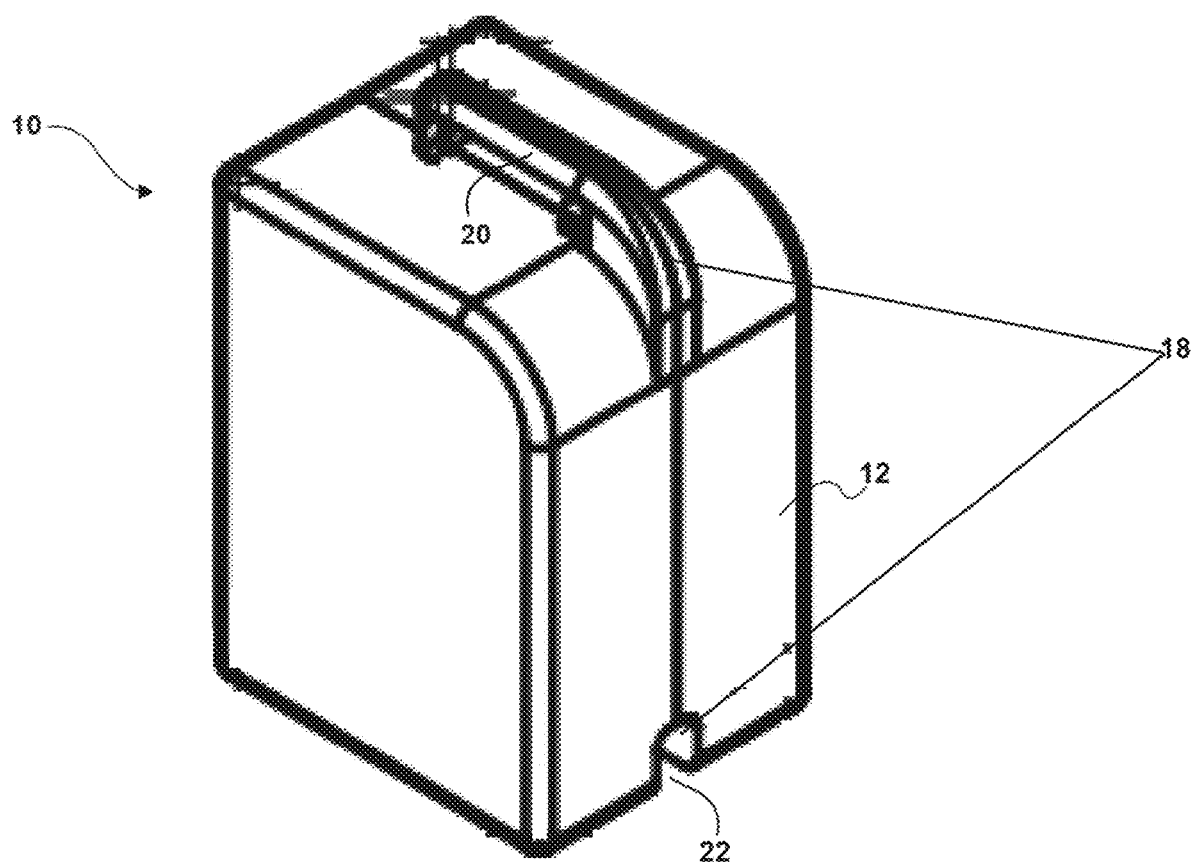
FIG. 1 illustrates a perspective view of modular container in accordance with at least one aspect of the present disclosure.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also include a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the modular container for fluid exchanges in detail, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the modular container disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, below, left, right, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

FIG. 1 illustrates a modular container 10 in accordance with at least one aspect of the present disclosure. The modular container 10 is configured to service a mechanical system. The modular container 10 may be utilized with any number of different mechanical systems. For example, according to various aspects, the modular container 10 can be used to service an internal combustion engine. According to other aspects, the modular container 10 can be utilized with a transmission, a hydraulic machine, etc. Likewise, the modular container 10 can be utilized with any number of services associated with such mechanical systems. For example, according to various aspects, the modular container 10 can be used to facilitate the exchange of fluids into and out of a mobile or immobile or inaccessible mechanical system. For the purpose of simplicity, the modular container 10 will be described hereinafter in the context of changing the oil in an internal combustion engine. However, it will be appreciated that the modular container 10 can be utilized to perform a varying number of services associated with a varying number of mechanical systems, other than performing an oil change on an internal combustion engine.

The modular container 10 includes a housing 12, a port 14 (See FIG. 3), a vent 16 (See FIG. 2), and a mechanical interlock system 18. The housing 12 can be fabricated from any material suitable for the intended application. For example, if the implementation of the modular container 10 will necessitate enhanced durability, the housing 12 can be fabricated from a metal. Alternatively, if the intended implementation requires transportability, the housing 12 can be fabricated from a light-weight plastic. Thus, the present disclosure contemplates any number of suitable materials for the housing 12 of the modular container 10.

The mechanical interlock system 18 is specifically configured to engage with a mechanical interlock system of a separate modular component. Several non-limiting examples of a separate modular component include a second modular container 10, a transport cart, a pump, a data acquisition unit and/or any other ancillary equipment separate from the modular container 10 itself. However, various other system components are contemplated by the present disclosure. As shown in FIG. 1, the mechanical interlock system 18 includes a first interlock element 20 and a second interlock element 22. The first interlock element 20 includes a protrusion extending from the housing 12 and the second interlock element 22 includes a recession within the housing 12. The protrusion of the first interlock element 20 includes a predetermined geometry that corresponds to an inverse geometry the second interlock element 22. Accordingly, the protrusion of the first interlock element 20 can be configured to nest within second interlock element 22 of a second modular container which is similar or identical to the modular container 10. Other aspects may leverage alternative geometries and configurations of mechanical features to ensure that the first interlock element 20 properly engages with the second interlock element 22 of a second modular container. Additionally, aside from altered geometries of the housing 12, other embodiments employ various clips, fasteners, and temporary adhesives to establish a selective engagement between separate modular components.

The mechanical interlock system 18 of the modular container 10 can be standardized across separate modular components of a modular system, such that the first interlock element 20 of the mechanical interlock system 18 can engage with a corresponding second interlock element 22 of a separate modular component. Likewise, the second interlock element 22 of the mechanical interlock system 18 can engage with a corresponding first interlock element 20 of a separate modular component. Accordingly, the modular container 10 can engage with, and couple to, a separate modular component, thereby mechanically connecting separate components of the modular system. For example, several modular containers 10 can be stacked on top of one another. Alternatively, the modular container 10 can be mounted to a transport cart for transportation to and from an immobile or otherwise inaccessible mechanical system. Although the mechanical interlock system 18 of FIG. 1 includes a first interlock element 20 including a protrusion and a second interlock element 22 including a recession, other corresponding geometrical configurations are contemplated by the present disclosure to achieve the same effect. In still other aspects, the mechanical interlock system 18 can be configured to provide additional functionality. For example, the first interlock element 20 of FIG. 1 is configured to simultaneously function as a handle to promote an ergonomic handling of the modular container 10.

Figure 2:
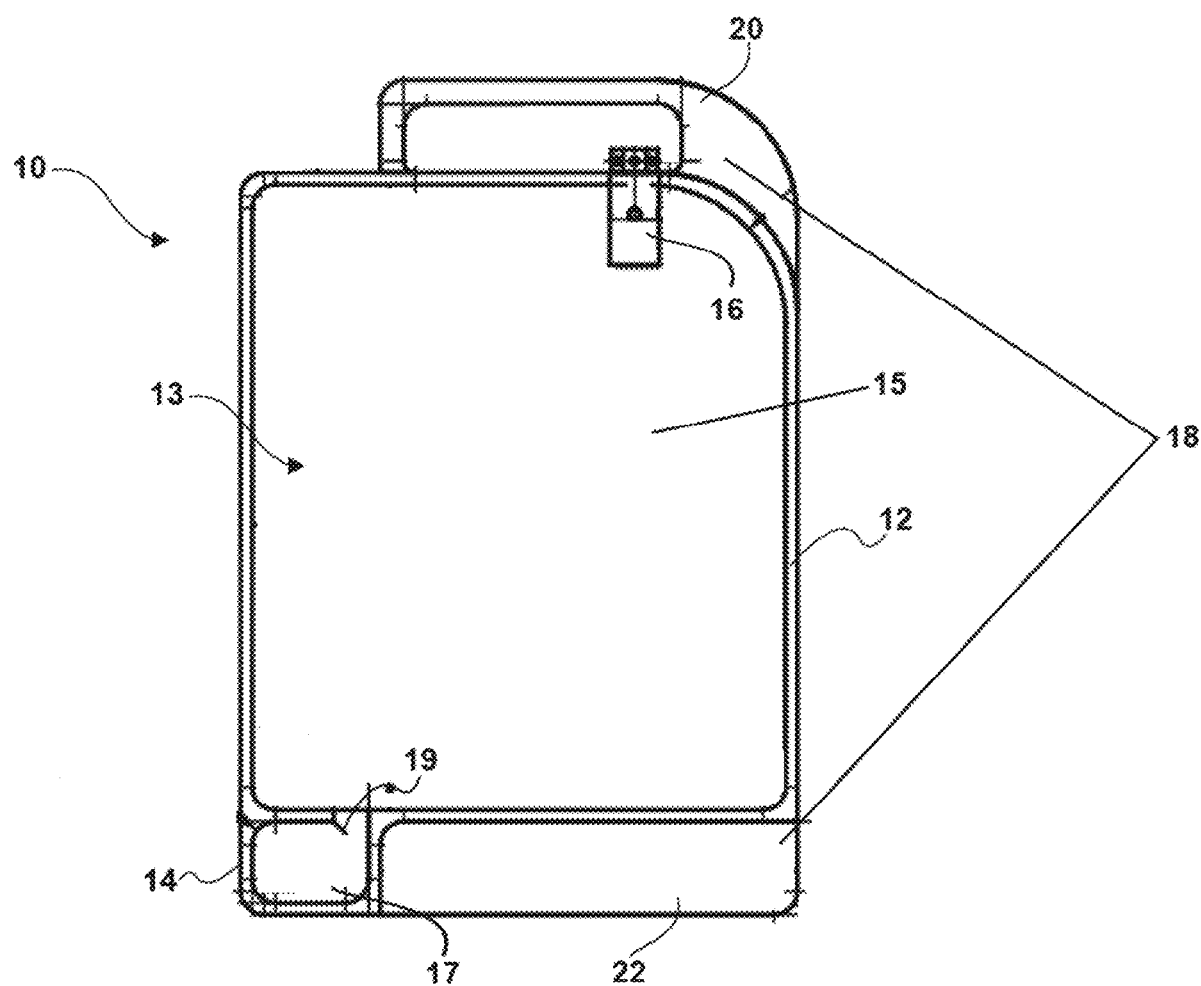
FIG. 2 illustrates a cross-sectioned side view of the modular container of FIG. 1, in accordance with at least one aspect of the present disclosure.

FIG. 2 illustrates a cross-sectioned side view of the modular container 10, in accordance with at least one aspect of the present disclosure. In FIG. 2, an exemplary configuration of the port 14, the vent 16, and the mechanical interlock system 18 of the modular container 10 are shown in positional relation to one another. Additionally, the housing 12 of the modular container 10 defines an internal cavity 13 configured to contain a contents. For example, the internal cavity 13 can be configured to store and transport a contents such as a fluid associated with the operation of a mechanical system. Examples of such a fluid can include oil, brake fluid, transmission fluid, and/or coolants, among other things. The internal cavity 13 can be further configured to accommodate a specifically intended contents. For example, the internal cavity 13 can be coated to prevent corrosion, rust, and/or contamination, among other things. Additionally and/or alternatively, the internal cavity 13 can include a specific geometry intended to generate a specific flow characteristic of the contents into and/or out of the internal cavity 13.

The internal cavity 13 can further include a primary chamber 15 and a secondary chamber 17 in fluid communication with the primary chamber 15. Accordingly, the primary chamber 15 can be primarily used for containing the contents within the internal cavity 13 of the housing 12, and the secondary chamber 17 can include a geometry specifically configured to channel the contents from the primary chamber 15 towards, and through, the port 14. However, according to other aspects, the internal cavity 13 lacks a secondary chamber 17. In yet other aspects, a primary chamber 15 of the internal cavity 13 may include geometrical features which operate to accomplish the foregoing effects in the absence of a secondary chamber 17.

As shown in FIG. 2, the geometry of the secondary chamber 17 can take advantage of gravitational forces to assist in a seamless evacuation of the contents from the primary chamber 15. For example, the secondary chamber 17 may include a geometry specifically configured to minimize the introduction of air bubbles into the contents. Furthermore, the secondary chamber 17 can include a geometry that will minimize the risk of inadvertent evacuation of the contents from the internal cavity 13 in the event the modular container 10 tips over. Accordingly, if the modular container 10 is not properly positioned in an intended orientation, the geometry creates a mechanical interference between the primary chamber 15 and secondary chamber 17 to assist with the prevention of spills and/or subsequent hazards. Alternatively and/or additionally, the secondary chamber 17 can include a geometry configured to capture contaminants within a contents being pumped into the internal cavity 13 before, such that contaminants are isolated for sampling and prevented from entering the primary chamber 15. For example, a secondary chamber 17 with such a geometry can be used to isolate contaminants from a used fluid that has been evacuated from the mechanical system and pumped into the modular container 10, thereby enabling easier access and analysis. Although a specific geometry comprising a specific geometric feature 19 is shown in FIG. 2, other geometries are contemplated by the present disclosure to accomplish the aforementioned objectives. Although the port 14 and secondary chamber 17 of FIG. 2 are depicted at the bottom of the modular container 10, according to other aspects the port 14 and the secondary chamber 17 can be located elsewhere to accommodate the specific needs of the mechanical system and service to be performed.

The port 14 is positioned within the internal cavity 13. Although the port 14 is shown in FIG. 2 as being in fluid communication with the secondary chamber 17, it will be appreciated that according to other aspects the port 14 is in fluid communication with the primary chamber 15. Thus, the specific location of the port 14 can be alternately configured in relation to the internal geometry of the internal cavity 13.

Figure 3:
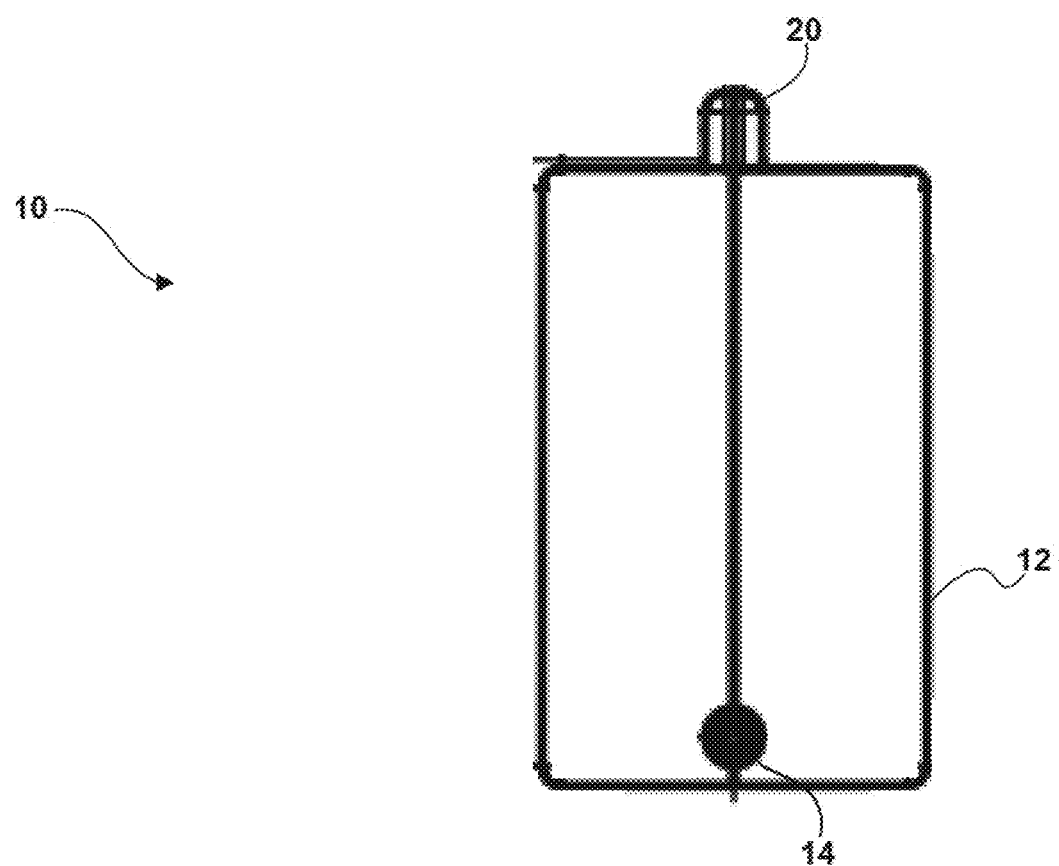
FIG. 3 illustrates a front view of the modular container of FIG. 1, in accordance with at least one aspect of the present disclosure.

FIG. 3 illustrates a front view of the modular container 10 in accordance with at least one aspect of the present disclosure. The front view depicts the port 14, which can be configured to either empty or fill the modular container 10, depending on the specific operation intended to be performed. In one aspect, the port 14 can include a Quick-Disconnect ("QD") coupler configured to provide a fast and reliable fluid connection between the internal cavity 13 of the modular container 10 and a separate modular component, when the port 14 is open. The port 14 can be configured to connect and disconnect the modular container 10 to a separate modular component (not shown) such as a pump, for example, either directly or via a hose or other suitable cabling. The pump can either evacuate the contents from the internal cavity 13 of the modular container 10, or introduce a contents into the internal cavity 13 of the modular container 10. According to other aspects, the port 14 can include a check valve (not shown) configured to prevent the inadvertent evacuation of a contents from within the internal cavity 13 of the housing 12 (see e.g., FIG. 7).

Figure 4:
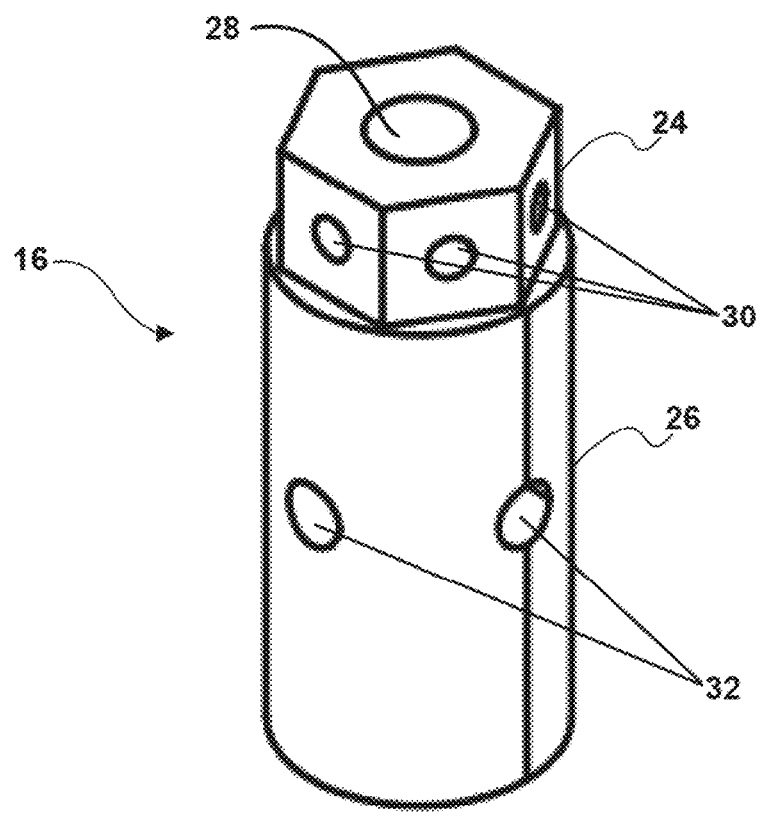
FIG. 4 illustrates a perspective view of a vent of a modular container in accordance with at least one aspect of the present disclosure.
Figure 5:
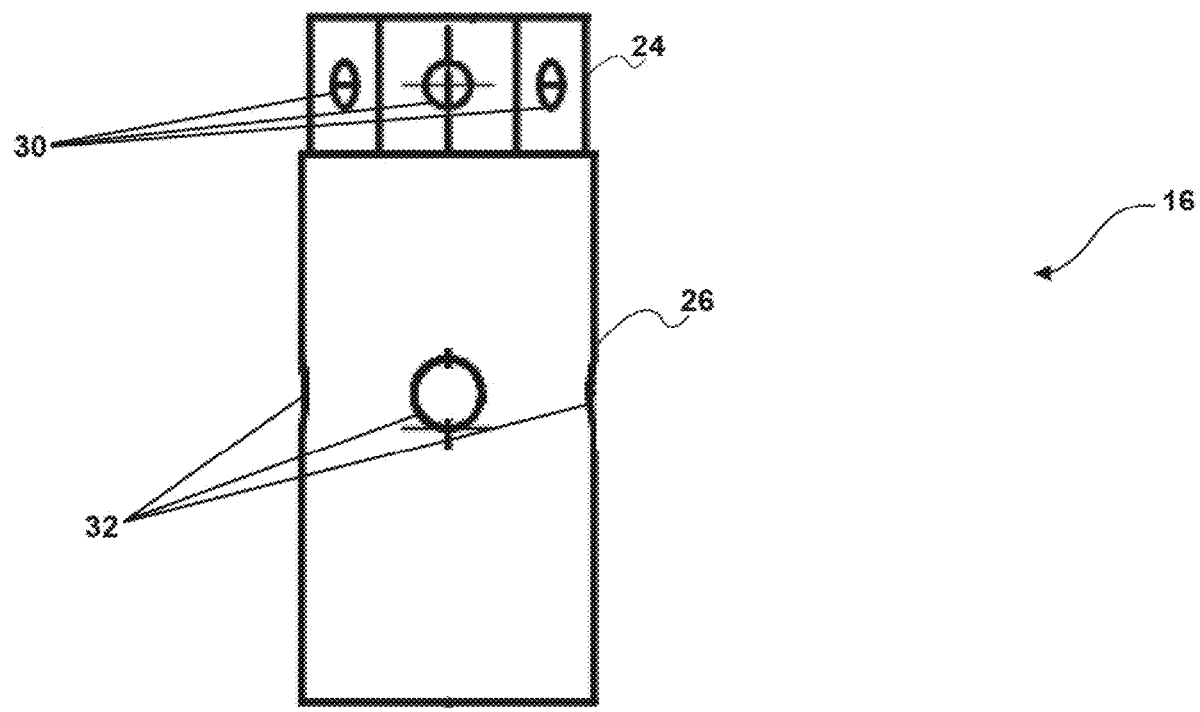
FIG. 5 illustrates a side view of the vent of FIG. 4, in accordance with at least one aspect of the present disclosure.
Figure 6:
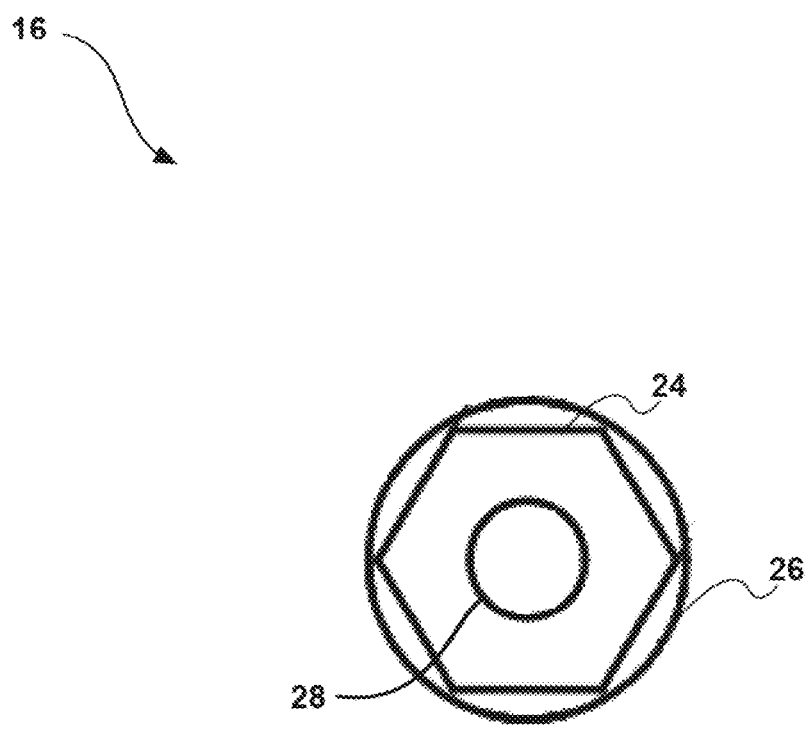
FIG. 6 illustrates a top view of the vent of FIG. 5, in accordance with at least one aspect of the present disclosure.

FIGS. 4-6 illustrate various views of the vent 16 in accordance with at least one aspect of the present disclosure. More specifically, FIG. 4 illustrates a perspective view of the vent 16, FIG. 5 illustrates a side view of the vent 16 and FIG. 6 illustrates a top view of the vent 16. The vent 16 includes a first portion 24 adjoined to a second portion 26, wherein both portions 24, 26 collectively define an opening 28 therein. The first portion 24 of the vent 16 is configured to be positioned external to the modular container 10, whereas the second portion 26 of the vent 16 is configured to be positioned on the inside of the internal cavity 13. Thus, the opening 28 of the vent 16 places the internal cavity 13 in fluid communication with the external environment of the modular container 10 (see e.g., FIG. 2). The first portion 24 can include a hexagonal nut with tapped threads and the second portion 26 can include a threaded bolt. Accordingly, the second portion 26 can be inserted into a hole of the housing 12 while the first portion 24 is attached thereto. As such, the vent 16 can be configured to minimize the amount of required assembly. However, in other aspects, the vent 16 is comprised of a single piece of material and is otherwise inserted through the housing 12. Additionally, although the vent 16 shown in FIGS. 4-6 includes a first portion 24 and second portion 26, the present disclosure further contemplates other aspects wherein the vent 16 comprises a singular external geometry, among others, designed to facilitate the desired airflow into and out of the internal cavity 13. Likewise, although FIGS. 1-3 depict one vent 16 configured on the top of the modular container 10, the present disclosure contemplates other aspects which include any number of vents 16 positioned on the modular container 10 in a variety of positions, depending on the intended application and desired airflow.

The first portion 24 of the vent 16 defines a first plurality of openings 28 and the second portion 26 of the vent 16 defines a second plurality of openings 30. The first plurality of openings 30 and the second plurality of openings 32 are configured to allow air within the internal cavity 13 to flow through the opening 28 of the vent 16 to the outside of the modular container 10. Likewise, air outside of the modular container 10 can flow through the opening 28 to the inside of the internal cavity 13. Because the vent 16 is configured to facilitate airflow to and from the internal cavity 13, the vent 16 can be further configured to prevent the introduction of external contaminants from disrupting the contents of the internal cavity 13. Accordingly, the first plurality of openings 30 and second plurality of openings 32 are further configured to prevent particles within the air from entering the internal cavity 13. For example, the first and second plurality of openings 30, 32 can be sized to prevent particulate larger than 10 microns from passing through the opening 28. The size of the filtered particulate can be altered to optimize airflow and filtration. Thus, the vent 16 can prevent certain pollutants from reaching the contents of the modular container 10 and/or reduce the emission of potentially hazardous vapors from within the modular container 10. Alternatively and/or additionally, the vent 16 can include a screen configured within the openings 30, 32 to enhance the filtration. Although the vent 16 of FIGS. 4-6 utilizes the first and second plurality of openings 30, 32 to achieve this effect, the present disclosure further contemplates other aspects which include alternate geometrical configurations for particulate filtering. For example, the present disclosure contemplates an aspect wherein the vent 16 does not include the openings 30, 32, and the opening 28 includes an internal geometry configured to preclude particles of a specific size from passing through it and entering and/or exiting the internal cavity 13 defined by the housing 12 of the modular container 10.

The vent 16 can work in conjunction with the port 14 to facilitate the evacuation and filling of the modular tank 10 by balancing the pressure within the internal cavity 13. When a pump is connected to the port 14 of the modular container 10, a fluid can be either introduced to or removed from the internal cavity 13 without subjecting the housing 12 to an undesired structural stress. For example, when the pump begins to suck the fluid through the port 14, the vent 16 allows air to flow from the outside of the modular container 10 into the internal cavity 13 and through the port 14, reducing the suction force exerted on the housing 12. Similarly, if a fluid is being pumped into the modular container 10, air within the internal cavity 13 will be displaced through the vent 16, minimizing the expansive stress that would otherwise be exerted on the housing 12. The aforementioned filtration features of the vent 16 facilitate this airflow while preventing undesirable particulate from entering and exiting the internal cavity 13.

According to various aspects (not shown), the vent 16 and the modular container 10 can include interlocking geometries similar to that of mechanical interlock system 18. For example, the vent 16 can be configured to protrude from the top of the modular container 10 and a second modular container (not shown) can include a recession on the bottom of its housing in a location that corresponds to that of vent 16 on the modular container 10. The recession can be configured to accommodate and mechanically engage with the protruding vent 16 of the modular container 10. For example, the recession, along with the interlock system 18 of the modular container 10, can enable the second modular container to be safely stacked on top of the modular container 10, or attached to a separate modular component, such as a transportable cart. In still other aspects, the recession can include a second vent (not shown) configured to be in fluid communication with vent 16 when the second container and modular container 10 are mechanically engaged. Accordingly, fluid communication can be established between the internal cavity 13 of the modular container 10 and an internal cavity of the second container. This can enable more efficient use of a system of modular containers, including the simultaneous filling, or evacuation, of each container when at least one pump is connected to the port 14 of the modular container 10. The present disclosure contemplates still other aspects wherein the port 14 includes a similar interlock configuration, thereby enabling it to mechanically engage, and be placed in fluid communication, with a port of the second modular container (not shown).

According to various aspects, the modular container 10 can include a variety of sensors configured to detect a characteristic of the contents contained within the internal cavity 13. For example, the sensors can be configured to detect a pressure of the contents within the internal cavity 13. Alternatively and/or additionally, the sensors can be configured to determine a volume of the internal cavity 13 that is occupied by the contents. For example, the modular container 10 can include a sensor configured to measure the level of the contents within the internal cavity 13. The sensors can be in signal communication with a control circuit (not shown) which includes a field programmable gate array (FPGA), a processor or the like. According to various aspects, the sensors form a part of the control circuit. The control circuit is configured to control separate modular components of a modular containment system.

Figure 7:
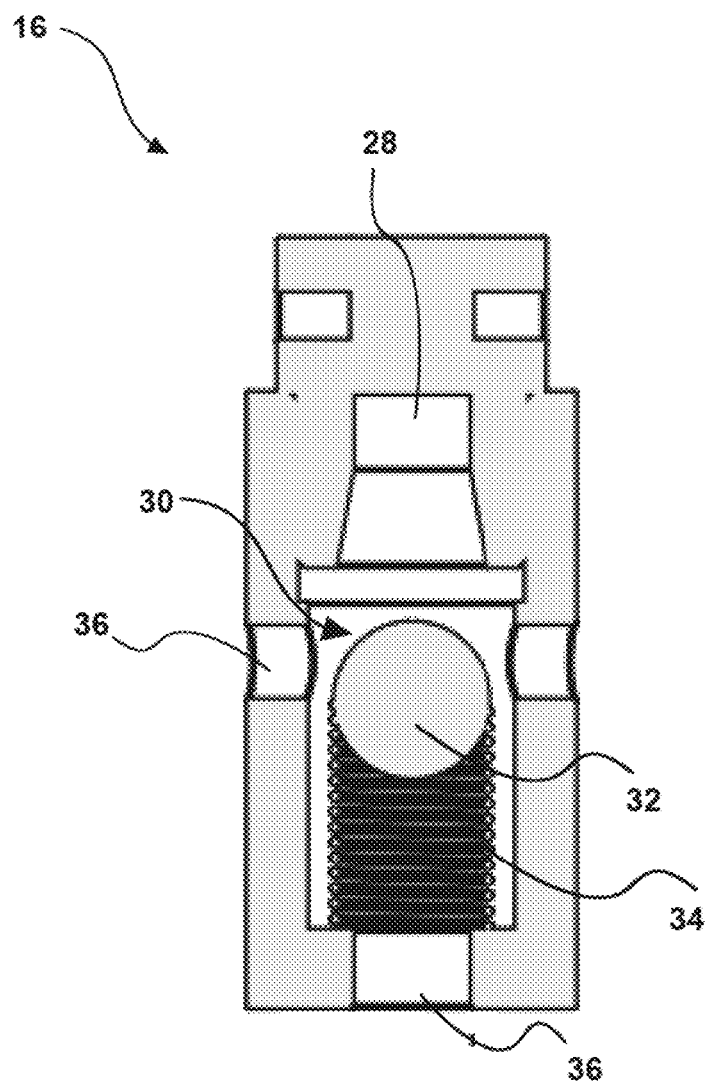
FIG. 7 illustrates a cross-sectioned side view of the vent of FIG. 4, further illustrating a check valve in accordance with at least one aspect of the present disclosure.

FIG. 7 illustrates a cross-sectioned side view of the vent of FIG. 4, further illustrating a check valve 30 in accordance with at least one aspect of the present disclosure. Although the check valve 30 is shown as being positioned within the vent 16, other locations are contemplated by the present disclosure, including but not limited to the port 14 of the modular container 10. The check valve 30 is configured to transition between a biased position and an unbiased position. The check valve 30 includes a ball 32, a spring element 34, and two fluid pathways 36 configured to be in fluid communication with the opening 28. When the check valve 30 is in its biased position the spring element 34 can be configured to exert a biasing force on the ball 32 such that the ball 32 blocks the opening 28, thereby preventing a contents of the internal cavity 13 from accessing the opening 36 and exiting the modular container 10 via the fluid pathways 36. However, when the modular container 10 is being filled with a contents, a fluid pressure within the internal cavity 13 overcomes the biasing force of the spring element 34, thereby moving the ball 32 away from the opening 28 and allowing air to evacuate the internal cavity 13 of the modular container 10 via the fluid pathways 36.

Alternatively, the spring element 34 can be configured to exert a biasing force on the ball 32 such that the ball 32 does not block the opening 28 when the modular container 10 is positioned in a first orientation, thereby allowing a contents of the internal cavity 13 to access the opening 36 and exit the modular container 10 via the fluid pathways 36. However, in this alternate configuration, when the modular container 10 is positioned in a second orientation, the check valve 30 can transition from the biased position to the unbiased position, wherein a fluid pressure generated by the contents of the internal cavity 13 overcomes the biasing force of the spring element 34, moving the ball 32 in front of the opening 28, and blocking the contents of the internal cavity 13 from accessing the opening 28 and evacuating the modular container 10 via the fluid pathways 36.

In the alternate configuration of check valve 30, the first orientation can be the predetermined position of the modular container 10 when it is being filled or evacuated such that the check valve 30 is biased and the contents can flow freely to and from the internal cavity 13. However, when the modular container 10 is positioned in an unintended orientation, the check valve 30 will transition to the unbiased position, thereby blocking the contents of the internal cavity 13 from accessing the opening 28 and preventing an inadvertent evacuation of the contents. For example, if a pump were connected to the port 14 and the modular container 10 was being filled, the modular container 10 would be positioned in its first, or intended, orientation. Accordingly, the check valve 30 would remain open and in its biased position such that a first contents, such as air, from the internal cavity 13 could evacuate the modular container 10 as the pump displaced it with a second contents, such as used oil. However, if a user accidently knocked the modular container 10 over while it was being filled, the modular container would no longer be positioned in its first, or intended, orientation. Accordingly, the oil would generate a fluid pressure strong enough to overcome the biasing force of the spring element 34, thereby moving the ball 32 into the opening 28 and preventing the oil from spilling out of the internal cavity 13.

Alternatively, the check valve 30 can be biased in a closed configuration and opened in response to an external fluid pressure. This configuration is particularly useful for a check valve 30 implemented at the port 14 of the modular container 10, such that the port 14 remains closed until a fluid pressure generated by the pump opens the check valve 30. Thus, the check valve 30 can be specifically configured to function in support of an intended location and implementation. Additionally, although the check valve 30 includes a ball and seat configuration, alternate configurations are contemplated by the present disclosure, including but not limited to a swing, lift, dual plate, and/or stop check type configurations. Similarly, other aspects of the check valve 30 include components such as swing hinges, a duck bills, dual plates, and discs to accomplish the same effect.

Figure 8:
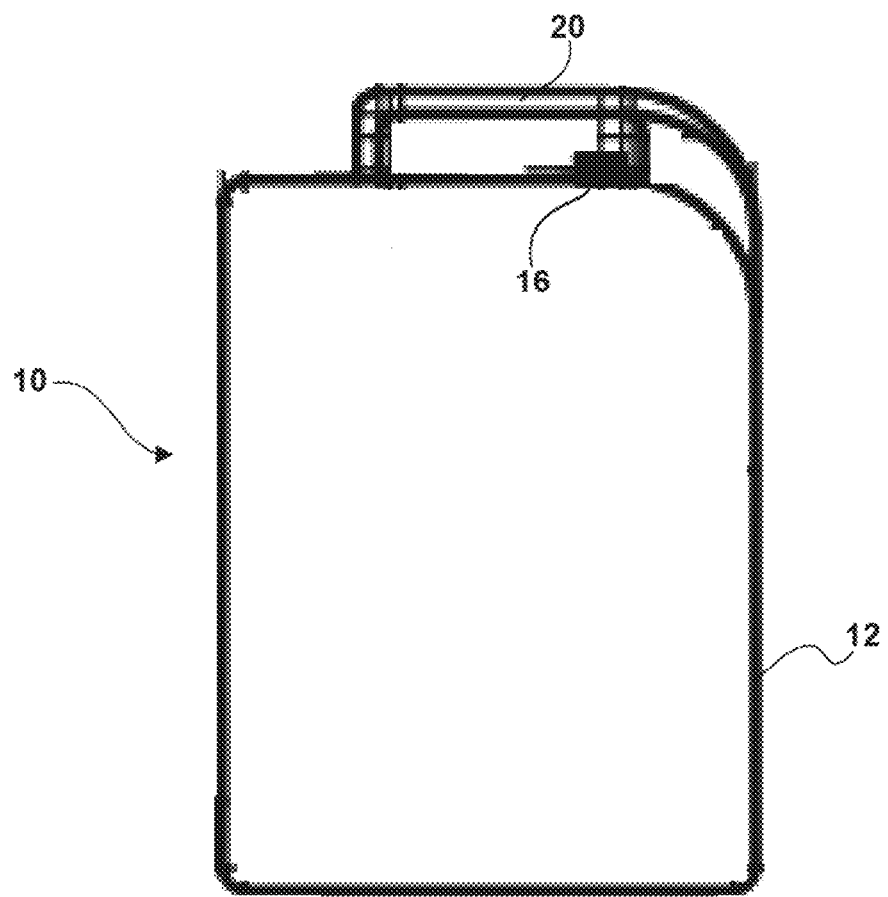
FIG. 8 illustrates a side view of the modular container of FIG. 1, in accordance with at least one aspect of the present disclosure.
Figure 9:
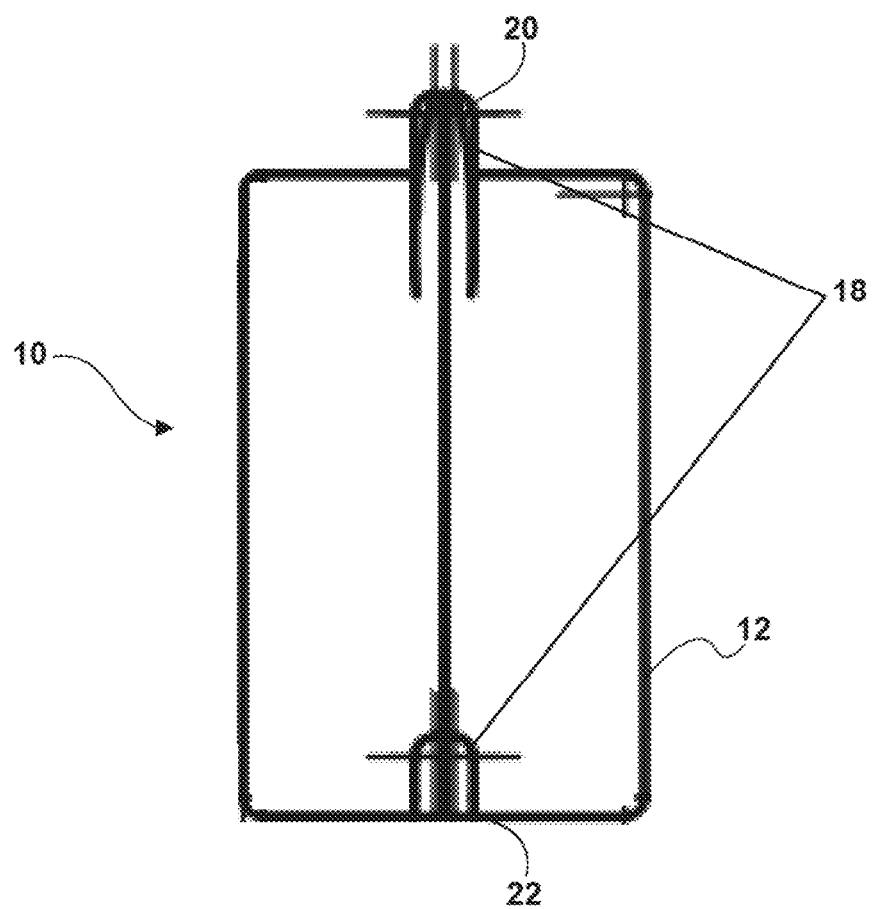
FIG. 9 illustrates a back view of the modular container of FIG. 1, in accordance with at least one aspect of the present disclosure.
Figure 10:
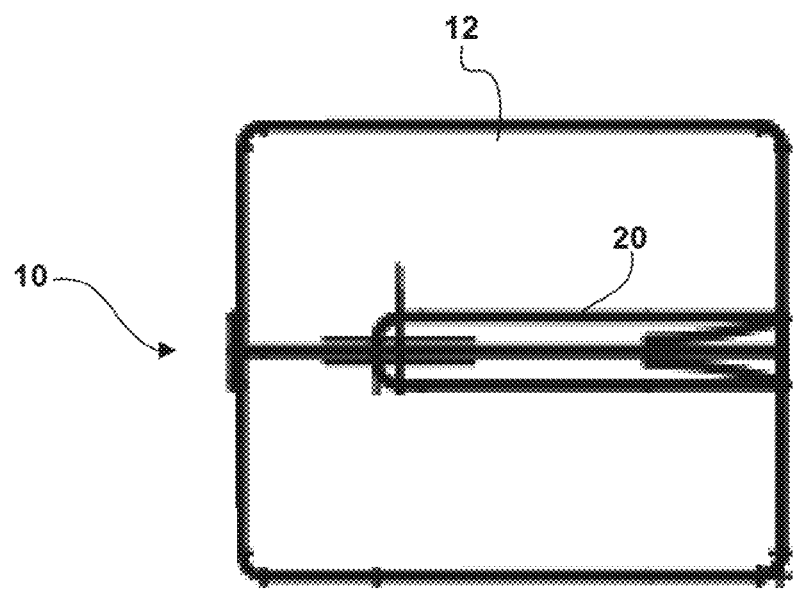
FIG. 10 illustrates a top view of the modular container of FIG. 1, in accordance with at least one aspect of the present disclosure.

FIGS. 8-10 depict additional views of the modular container 10 in accordance with at least one aspect of the present disclosure, further illustrating the modular nature of the modular container 10. More specifically, FIG. 8 illustrates a side view of the modular container 10, FIG. 9 illustrates a back view of the modular container 10 and FIG. 10 illustrates a top view of the modular container 10. As shown in FIG. 9, the orientation of the first interlock element 20, which protrudes from the housing 12, is aligned with the orientation of the second interlock element 18, which recesses into the housing 12.

Figure 11:
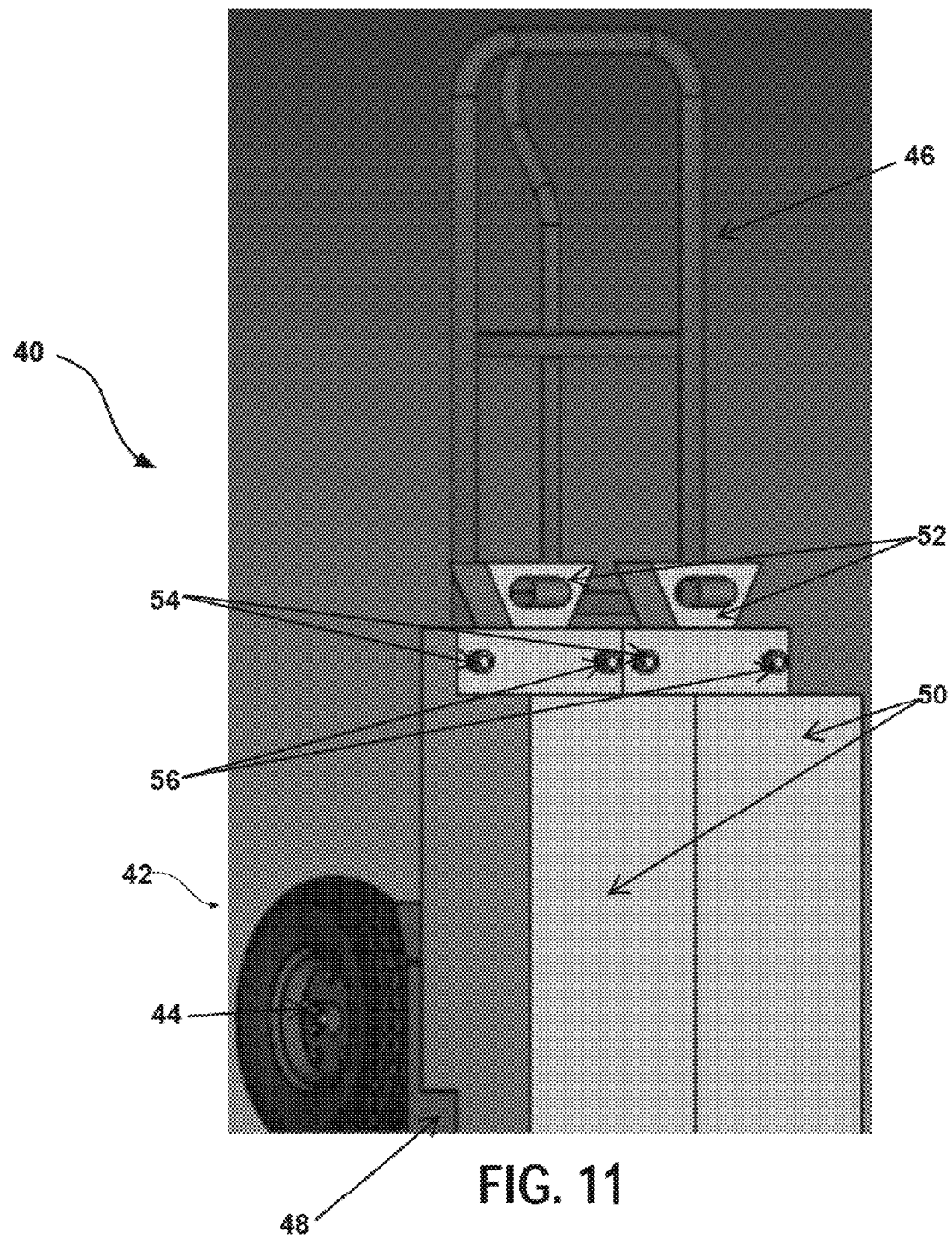
FIG. 11 illustrates a perspective view of a modular containment system in accordance with at least one aspect of the present disclosure.
Figure 12:
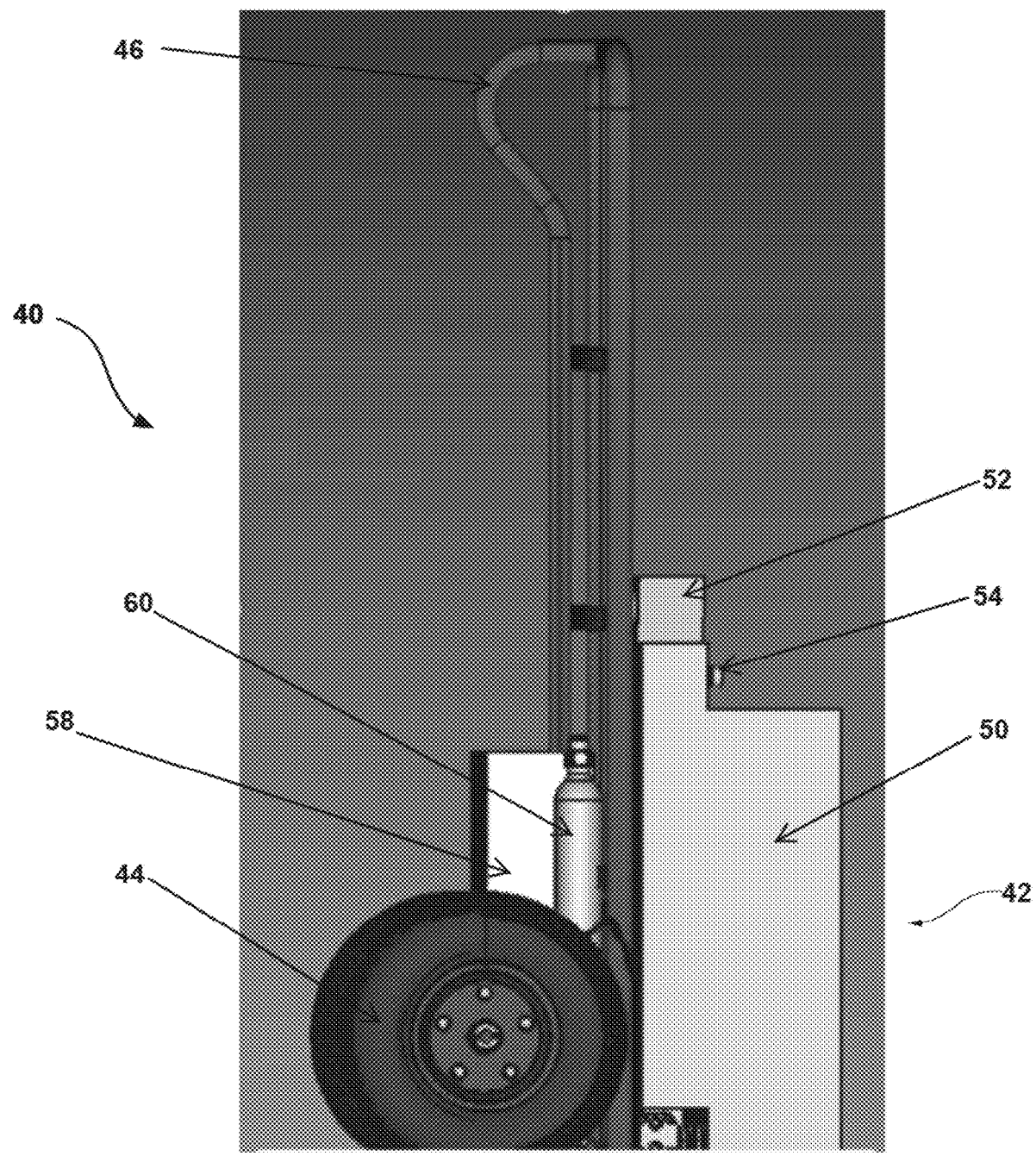
FIG. 12 illustrates a side view of the modular containment system of FIG. 11, in accordance with at least one aspect of the present disclosure.

FIGS. 11 and 12 illustrate a modular containment system 40 in accordance with at least one aspect of the present disclosure. More specifically, FIG. 11 illustrates a perspective view of the modular containment system 40 and FIG. 12 illustrates a side view of the modular containment system 40. The modular containment system 40 includes a transportable cart 42 which includes a bed 48 configured to support and transport at least two modular containers 50. The modular containers 50 may be similar or identical to the modular container 10 described above. Each modular container 50 includes a first interlock element 52, a port 54 and a vent 56. The first interlock element 52 is configured to function in conjunction with a second interlock element (not shown) in a manner similar to the aforementioned mechanical interlock system 18. The first interlock element 52 notably includes a geometry that is different than that of first interlock element 20, illustrating the flexibility of the design contemplated by the present disclosure. Different geometries and methods of mechanical engagement can be selected to accommodate specific design needs. For example, the geometry of mechanical interlock system 18 may be selected for enhanced handling, whereas the geometry of first interlock element 52 may provide greater structural stability, such to enhance the transportability of the modular containment system 40. The present disclosure contemplates mechanical interlock systems including numerous interlock elements of varying geometries to customize the configuration of the modular containment system 40 for any intended implementation.

The transportable cart 42 also includes two wheels 44 and a handle 46. The present disclosure contemplates alternate embodiments of a transportable cart 42 including varying configurations. For example, the transportable cart 42 can include any number of wheels 44 and beds 48 of different sizes to accommodate the intended size of the modular containment system 40. The bed 48 of the transportable cart 42 can further include a first interlock element similar to that of modular container 50, such that the transportable cart 42 can mechanically engage with a second interlock element of the modular container 50. Likewise, the modular containment system 40 is configured to enable a second interlock element of an additional modular container to mechanically engage with the first interlock elements 52 of the modular containers 50. Accordingly, additional modular containers 50 can be added to the modular containment system 40 without compromising a mechanical stability. For example, additional modular containers can be stacked on top of the modular containers 50. However, the transportable cart 42 can be alternatively configured to accommodate any number of modular containers 50 in any number of configurations, in accordance with the intended implementation. Additionally, although the transportable cart 42 includes wheels, the term cart is used broadly to describe the transportability of the system. Thus, the present disclosure contemplates "carts" that are moveable with a variety of alternate mechanical systems, including but not limited to air lifts, rollers, and cranes.

The ports 54 and vents 56 of the modular container 50 can be specifically configured to include interlocking geometries similar to that of mechanical interlock system 18. For example, the vents 56 are configured to protrude from the top of the modular container 50. Additional modular containers (not shown) can further include a recession in a location corresponding to that of the vent 56 on the modular container 50. The recession can be configured to accommodate and mechanically engage with the protruding vent 56 of the modular container 50. The recession can further include a second vent configured to be in fluid communication with the vent 56 when an additional container and modular container 50 are mechanically engaged. For example, the vent 56 of the modular container 50, in conjunction with the recession and second vent of an additional modular container (not shown), can establish a fluid communication between an internal cavity of the modular container 50 and the additional container. The present disclosure contemplates still further aspects wherein the port 54 includes a similar interlock configuration, thereby enabling it to mechanically engage, and be placed in fluid communication, with a port of an additional modular container. These features can enable a more efficient use of the modular containment system 40, including the simultaneous filling, or evacuation, of each modular container 50. Additionally, the modular container 50 and any additional containers can be simultaneously filled or evacuated at various predetermined rates. The predetermined rate of a given modular container 50 could be equal to, or different than, the rate at which any additional container is simultaneously filled or evacuated. Thus, the interlock elements 52, ports 54 and vents 56 enable the modular containment system 40 to be customizable in accordance with the intended implementation.

As shown in FIG. 12, according to various aspects, the modular containment system 40 further includes separate modular components mounted to the back of the transportable cart 42. For example, the transportable cart 42 can include a pump 58 configured to connect to a port 54 of one or more of the modular containers 50. In operation, the pump 58 can be configured to remove a contents from one or more modular containers 50 and deliver it to a connected mechanical system. Alternatively and/or additionally, the pump 58 can be configured to deliver a contents from a connected mechanical system to one or more modular containers 50. In other aspects, the modular containment system 40 can include two or more pumps 58, wherein at least one pump 58 is configured to remove a contents from the modular containers 50, and at least one pump 58 is configured to deliver a contents to the modular containers 50.

The pump 58 can include interlocking elements similar or identical to those of the mechanical interlock system 18. Thus, the pump 58 can be mechanically configured on the modular containment system 40 and selectively positioned in accordance with its intended implementation. For example, if the pump is going to be removing a contents from a particular modular container 50, it can be stacked on top of that modular container 50 and configured to minimize a resistance of a fluid path of the contents. Alternatively and/or additionally, the pump 58 can be removed from the modular containment system 40 and positioned closer to the mechanical system. However, even when removed from the modular containment system 40, the pump will remain in fluid communication with the modular containment system 40, such that a contents can be either removed from or delivered to the modular containers 50. This configuration can be particularly useful if the pump 58 is configured to remove a contents from the mechanical system. For example, a user may prefer to pump the contents directly from the mechanical system rather than position the pump 58 on the transportable cart 42 and sucking the contents through a line. Such a configuration is possible due to the modular nature of the pump 58 and the customizable configuration afforded via the modular containment system 40.

The transportable cart 42 can further include a supply of purging agent 60 such as a fluid or gas. For example, the supply of purging agent 60 can include a pressurized fluid such as air, nitrogen, or carbon dioxide supplied by a compressor, a pressurized container and the like. However, alternate purging agents are further contemplated by the present disclosure and, in some aspects, the purging agent 60 is not pressurized but delivered to the mechanical system via the pump 58. In operation, the modular containment system 40 can provide the purging agent 60 to a connected mechanical system, where it is utilized to subsequently cleanse a filter of the mechanical system. For example, the purging agent 60 can be pressurized, or pumped, through the filter such that it dislodges and removes any trapped particulate. Accordingly, the purging agent 60 can enhance the filter's performance and extend its life.

According to various aspects, the modular containment system 40 can include a control circuit (not shown) which includes a field programmable gate array (FPGA), a processor or the like. The control circuit is in signal communication with sensors configured to sense a characteristic of the contents within the modular container 50 or the volume of an internal cavity of the modular container 50 that is occupied by the contents. According to various aspects, the sensors form a part of the control circuit. The control circuit can further be in signal communication with the pump 58. Accordingly, if the sensors detect a condition within the modular container 50 that could be potentially hazardous to the mechanical system, the modular containment system 40 or a user, the control circuit can operate to shut the pump 58 down, and/or reroute the contents to another modular container of the modular containment system 40. For example, if the sensor detects that the pressure of the contents within an internal cavity of the container 50 exceeds a predetermined threshold, the control circuit can turn the pump 58 off. Alternatively, if the sensors detect that an internal cavity of the modular container 50 is filled beyond a predetermined threshold, the control circuit can reroute the contents to another modular container.

Figure 13:
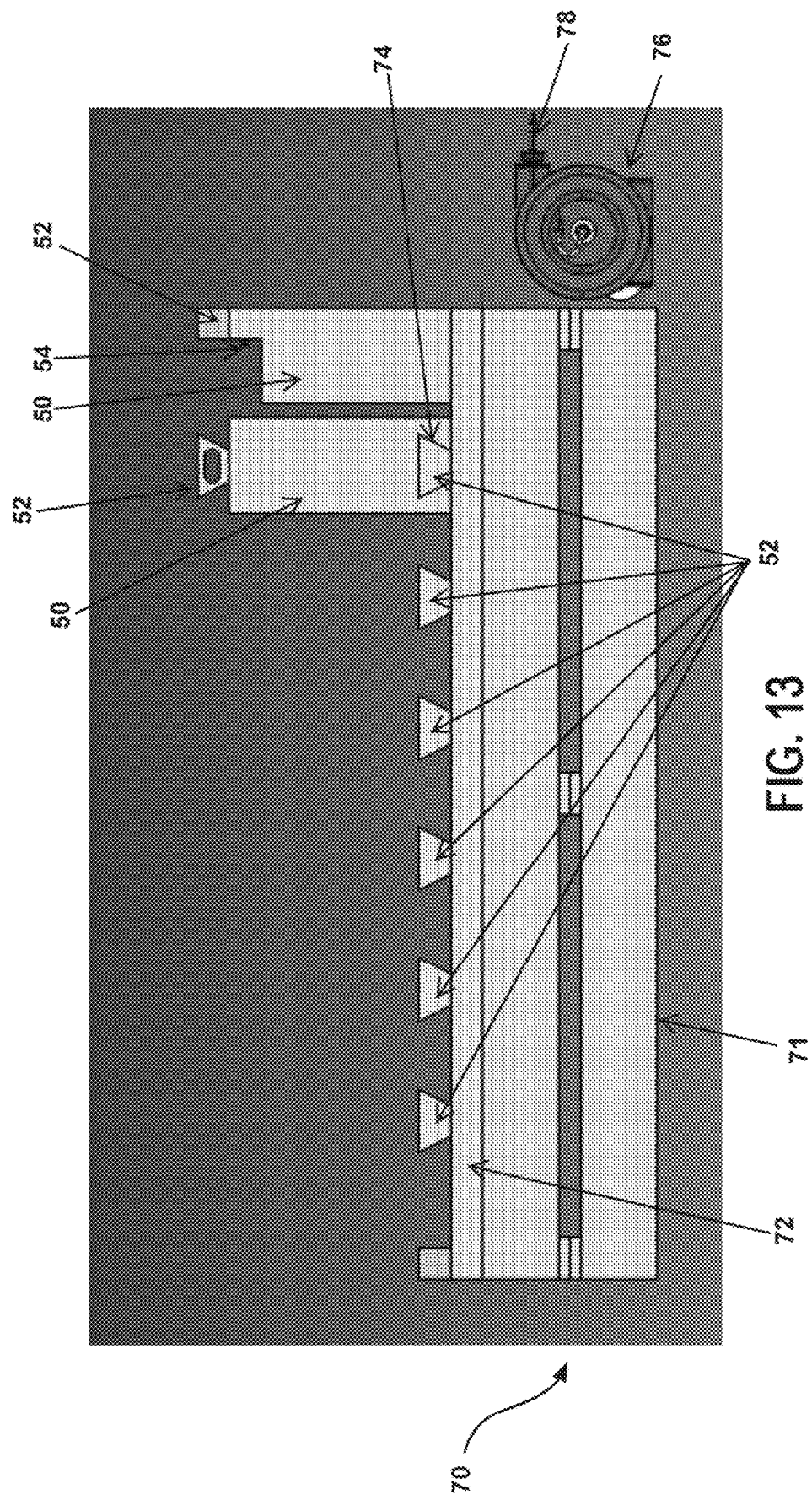
FIG. 13 illustrates a side view of another modular containment system in accordance with at least one aspect of the present disclosure.

FIG. 13 illustrates a side view of another modular containment system 70 in accordance with at least one aspect of the present disclosure. The modular containment system 70 is similar to the modular containment system 40 described above in that it includes a transportable cart 71 and modular containers 50, and can include a pump (not shown), but is different. For purposes of simplicity, the wheels of the modular containment system 70 are not shown in FIG. 13. The transportable cart 71 includes a bed 72 which includes a plurality of first interlock elements 52, such that a plurality of modular containers 50, each including a second interlock element 74, can be configured on the transportable cart 71 in accordance with the intended implementation. The transportable cart 71 is different from the transportable cart 42 described above, in that it includes a flatbed configuration in lieu of a hand truck configuration. Additionally, the configuration of the wheels of the modular containment system 70 can be different than the configuration of the wheels 44 of the modular containment system 40 depending on the intended implementation of the modular containment system 70. Furthermore, the transportable cart 71 can accommodate more modular components, further illustrating its modular nature. According to various aspects, the modular containment system 70 further includes a spool 76 configured to store a line 78 which is configured to connect a pump to a port 54 of any modular container 50 or any other separate modular component.

Figure 14:
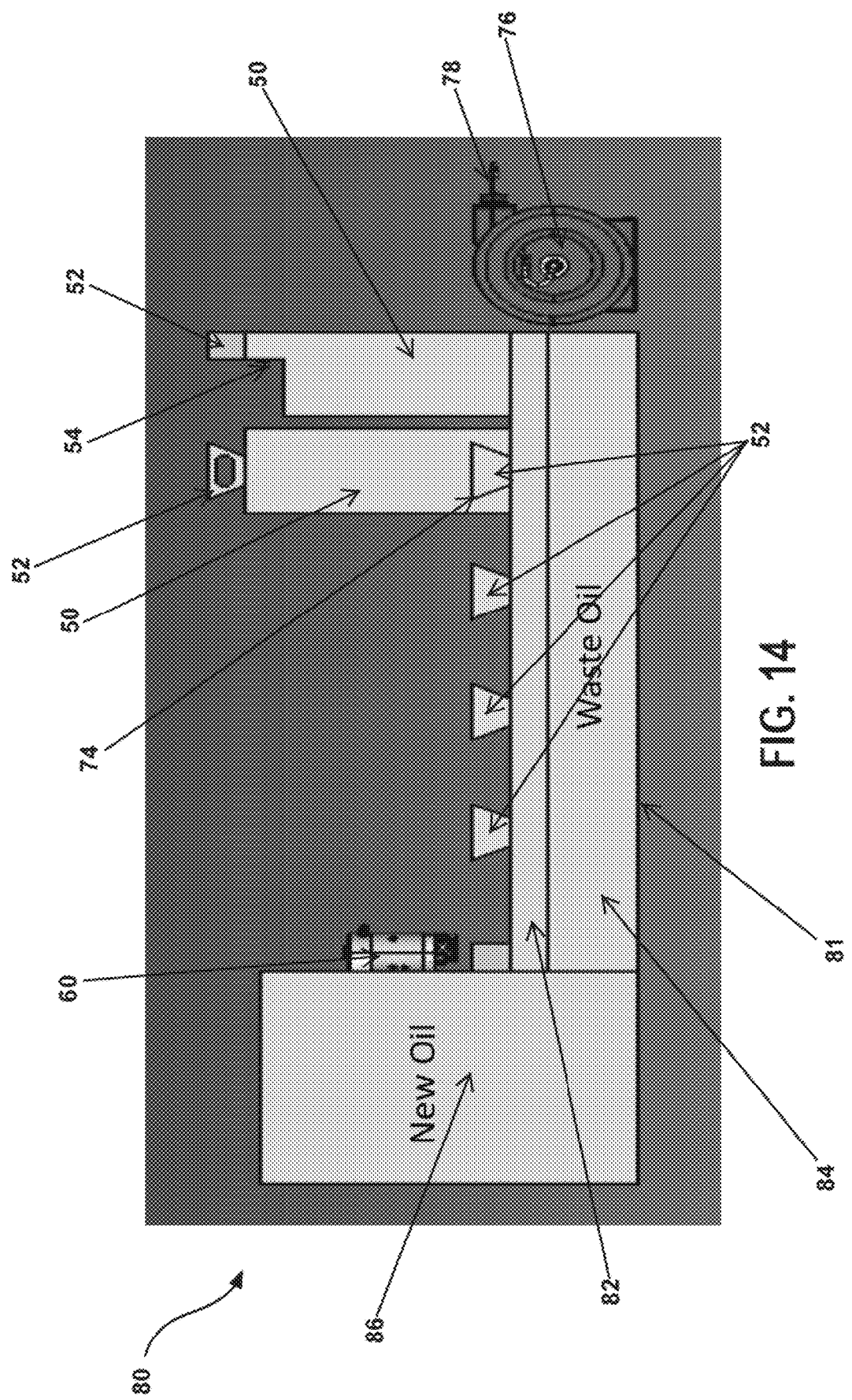
FIG. 14 illustrates a side view of yet another modular containment system in accordance with at least one aspect of the present disclosure.

FIG. 14 illustrates a side view of yet another modular containment system 80 in accordance with at least one aspect of the present disclosure. The modular containment system 80 is similar to the modular containment system 70 in that it includes a transportable cart 81 and modular containers 50, and can include a pump (not shown), but is different. For purposes of simplicity, the wheels of the modular containment system 80 are not shown in FIG. 14. The transportable cart 81 is similar to the transportable cart 71. The transportable cart 81 includes a bed 82 which includes a plurality of first interlock elements 52, such that a plurality of modular containers 50 including a second interlock element 74 can be configured on the transportable cart 81 in accordance with the intended implementation. The modular containment system 80 also includes a spool 76 and a line 78 as described above. However, the modular containment system 80 is different from the modular containment system 70 in that the modular containment system 80 also includes a supply of a purging agent 60, a waste contents tank 84 and a new contents tank 86.

For example, if the intention is to implement the modular containment system 80 to change the oil of an internal combustion engine, new oil can be contained within the new contents tank 86 and oil removed from the engine can be contained within the waste contents tank 84. This can be particularly useful if the modular containment system 80 is configured for multiple uses. For example, a technician can install a first modular container 50 filled with new oil and second, empty modular container 50 onto the bed 82 of the transportable cart 81. After connecting the line 78 to the ports 54 of the modular containers 52, the pump, and the engine, the modular containment system 80 can pump new oil from the first modular container 52 and into the engine. Likewise, the modular containment system 80 can pump used oil from the engine and into the second modular container 52. When the oil change is complete, any new oil remaining in the first modular container 50 can be drained into the new contents tank 86 for subsequent oil changes or prepped for storage in a larger inventory system. Likewise, the used oil can be deposited into the waste contents tank 84 for sampling and/or proper disposal. Accordingly, the modular containment system 80 with its transportable cart 81 and modular containers 50 can be easily relocated to the next mechanical system and repurposed without having to return them to a central facility. Furthermore, unused contents, such as the new oil, can be properly retained and managed, while waste contents, such as used oil, can be tested and/or safely disposed of with a reduced risk of environmental hazard.

Figure 15:
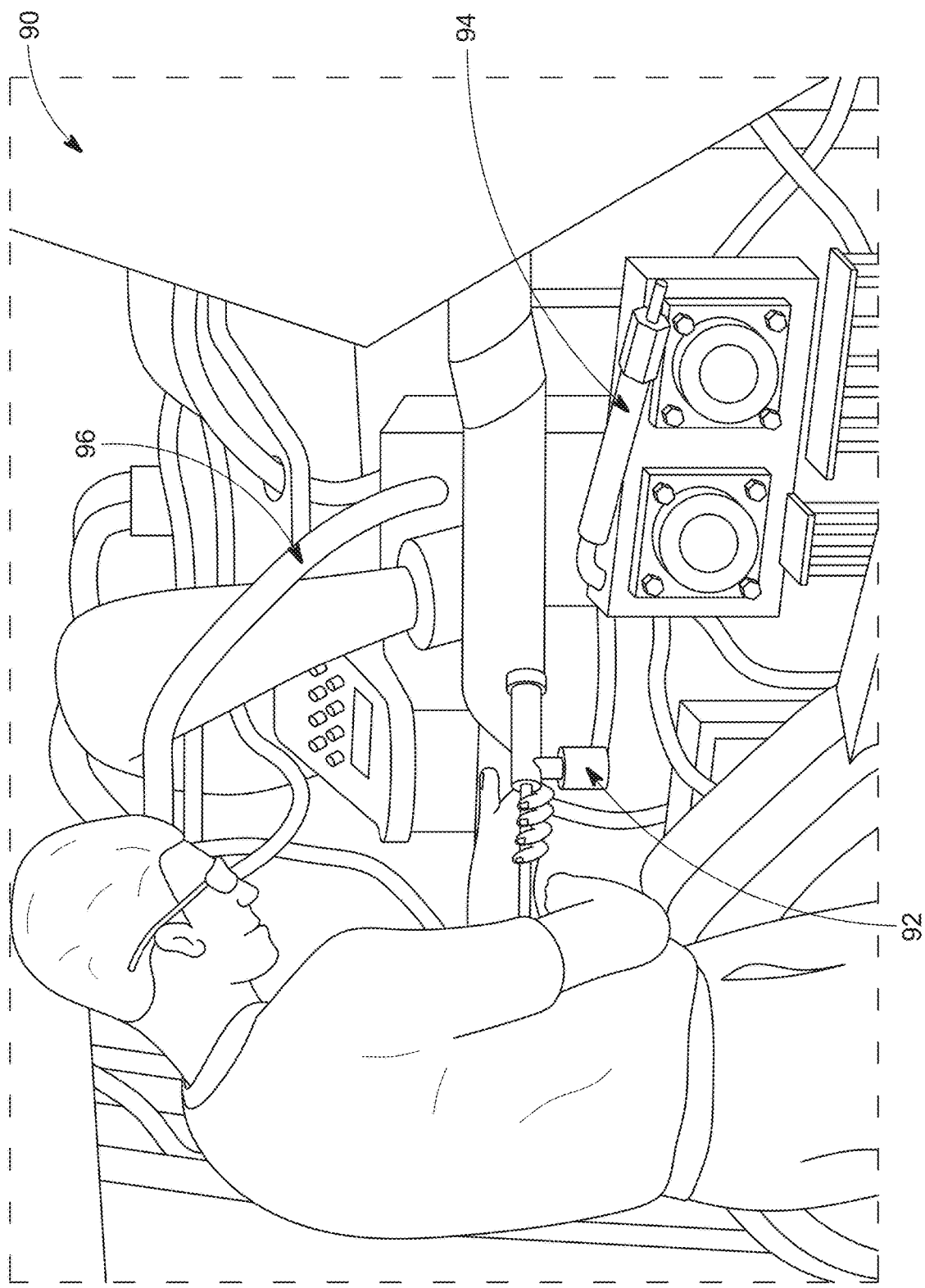
FIG. 15 illustrates yet another modular containment system in accordance with at least one aspect of the present disclosure.

FIG. 15 illustrates a modular containment system 90 in accordance with at least one aspect of the present disclosure. The modular containment system 90 includes a receptacle 92 configured to isolate a sample of a contents and store it for further use and/or processing. The receptacle 92 is depicted in fluid communication with a line 94 configured to transport a contents to and/or from a mechanical system 96. The receptacle 92 and line 94 configuration shown in FIG. 15 can be further configured in fluid communication with a pump, a modular container, or any other separate modular component of a transportable cart, depending on the intended implementation. The receptacle 92 can be configured to isolate a sample of the contents for processing subsequent to its removal from the mechanical system 96. Alternatively and/or additionally, the receptacle 92 can be configured to isolate a sample of the contents for testing and processing prior to its introduction to the mechanical system 96.

For example, when the mechanical system 96 is an internal combustion engine, the line 94 can be configured to remove used oil from the engine and the receptacle 92 is configured to isolate a sample of the used oil before it can continue through the line 94 to a separate modular component, such as a modular container. The sample contained within the receptacle 92 can then be processed. The subsequent processing can including testing and/or analysis of the used oil to monitor the health of the mechanical system, assess degradation of the contents through use, and promote maintenance and/or extend the useful life of either the mechanical system or the contents. For example, the processing can include quality, debris or elemental analysis of the contents isolated within the receptacle 92. Quality analysis can include an assessment of an additive depletion, oxidation, thermal profile, and/or other physical or chemical properties of the contents. Debris analysis can include an assessment of the presence, size, and/or origin of metallic and/or non-metallic particulate within the contents. Elemental analysis can determine the presence of foreign elements within the contents.

According to various aspects, the receptacle 92 can be removed from the line 94 such that the sample can be processed at a separate facility. Alternatively, the receptacle 92 can be removed from the line 94 and processed using a separate modular component of the modular containment system, such as a data acquisition assembly. For example, the data acquisition assembly can include a sensor assembly, a control circuit which includes a field programmable gate array (FPGA), a processor or the like, a memory, a transmission circuit, a receiver circuit, and/or a user interface, among other things. According to other aspects, the receptacle 92 can include a data acquisition assembly, or components thereof, within the receptacle 92 itself. For such aspects, the receptacle 92 can be in signal communication with separate modular components of the modular containment system and further configured to process the sample in real-time. In some aspects, the sensor assembly of the data acquisition assembly can be configured for real-time processing of the contents and includes near-real-time sensors integrated within the receptacle 92 itself. However, in other aspects, true-real-time sensors can be positioned within the line 94, directly within the primary flow path of the contents. For example, the present disclosure contemplates both intrusive and non-intrusive sensors configured to detect the dielectric constant, water content, thermos-oxidative degradation, acidity, dilution, metallic content, temperature, antioxidant depletion, inductive characteristics, refractivity, and/or spectrographic characteristics of the contents, among others selected for the particular processing required by the specific implementation of the modular containment system. Accordingly, the receptacle 92 and modular containment system of the present disclosure enables on-site processing capabilities for otherwise immobile and/or inaccessible mechanical systems.

Figure 16:
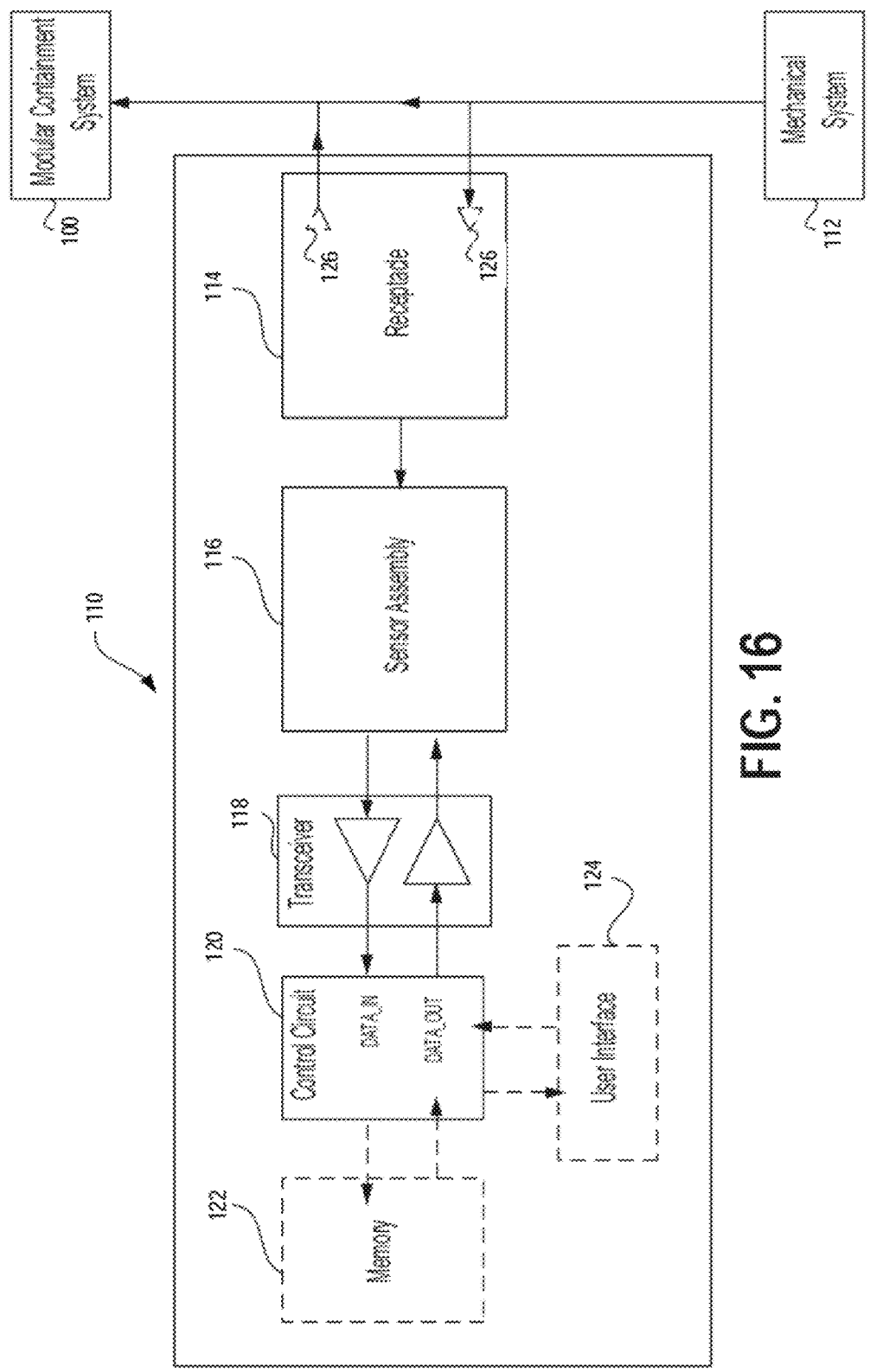
FIG. 16 illustrates a system diagram of yet another modular containment system in accordance with at least one aspect of the present disclosure.

FIG. 16 illustrates a system diagram of yet another modular containment system 100 in accordance with at least one aspect of the present disclosure. The modular containment system 100 includes a sampling system 110. The sampling system 110 can be in fluid communication with a mechanical system 112 and the modular containment system 100. The sampling system 110 includes a receptacle 114, a sensor assembly 116, a transceiver 118 and a control circuit 120. The receptacle 114 can be in fluid communication with the sensor assembly 116, which can be in signal communication with the transceiver 118, which can be in signal communication with the control circuit 120. Although each of these subcomponents are depicted as separate hardware components of the sampling system 110, the functionality of several components can be combined into one or more assemblies. For example, in some aspects, the control circuit 120 can include the functionality of transceiver 118. Furthermore, although the sensor assembly 116, the transceiver 118 and the control circuit 120 of the sampling system 110 are positioned within a housing of the receptacle 114 and configured for a real-time processing of the contents, other aspects include each as a separate modular component of the modular containment system 100. For example, the sensor assembly 116, the transceiver 118 and the control circuit 120 of the sampling system 110 can be configured as separate modular components configured to mechanically interlock to a transportable cart of the modular containment system 100. Accordingly, once the contents have been isolated, the receptacle 114 can be removed from the line and configured in fluid communication with the sensor assembly 116, the transceiver 118 and the control circuit 120 of the sampling system 110 on the transportable cart of the modular containment system 100.

According to various aspects, the control circuit 120 can include a logic-based controller such as a field programmable gate assembly (FPGA) a processor or the like configured to execute instructions either stored in an optional memory 122 and/or received from a user interface 124. The sensor assembly 116 can be configured to include sensors, among other hardware, to detect one or more characteristics of the contents isolated within the receptacle 114. As previously noted, the sensor assembly 116 can be configured for true-real-time or near-real-time processing. Furthermore, the sensor assembly 116 can include sensors configured to detect the dielectric constant, water content, thermos-oxidative degradation, acidity, dilution, metallic content, temperature, antioxidant depletion, inductive characteristics, refractivity, and/or spectrographic characteristics of the contents, among others selected for the particular processing required by the specific implementation of the modular containment system 100.

According to various aspects, the receptacle 114 can include valves 126 configured to either manually or automatically control the flow of contents from the mechanical system 112 to the receptacle 114. If such valves 126 are automatically controlled, the receptacle 114 can be further configured in signal communication with other components of the sampling system 110, such as the control circuit 120, among others. In other aspects, the sampling system 110 includes a memory 122 configured to store an instruction. The instruction can be received as an input from a user interface 124, or received from a separate system via the transceiver 118. Additionally, the instruction can be a user selected setting configured to affect a behavior of the control circuit 120 if certain conditions are satisfied. For example, the setting can instruct the control circuit 120 to close a valve 126 of the receptacle 114 if the sensor assembly 116 detects that a characteristic of the contents exceeds a predetermined threshold. Additionally and/or alternatively, the control circuit 120 can issue a notification to a user of the modular containment system 100. Accordingly, if the sampling system 110 identifies a condition that is potentially hazardous to either the modular containment system 100 or the mechanical system 112, the control circuit 120 can be programmed to protect the system and/or user.

EXAMPLES

Example 1—A modular container is provided. The modular container comprises a housing, a port, a vent, and a mechanical interlock system. The housing defines an internal cavity configured to contain a contents. The port is configured to selectively allow the contents to enter and exit the internal cavity. The vent is configured to allow particles of a predetermined size to enter and exit the internal cavity of the housing when the modular container is oriented in a first position, and further configured to prevent the contents from exiting the internal cavity when the modular container is oriented in a second position. The mechanical interlock system includes a first interlock element and a second interlock element. The first interlock element is configured to mechanically engage with a corresponding second interlock element of a separate modular component, and the second interlock element is configured to mechanically engage with a corresponding first interlock element of a separate system component.

Example 2—The modular container of Example 1, wherein the port is configured to connect to a pump configured to remove the contents from the internal cavity of the housing, and wherein, upon activation of the pump, the vent allows an airflow comprising air particles equal to or less than the predetermined size into the primary internal cavity of the housing.

Example 3—The modular container of Examples 1 or 2, wherein the internal cavity comprises a primary chamber and a secondary chamber in fluid communication with the primary chamber, wherein the secondary chamber comprises a geometry configured to channel the contents from the primary chamber to the port.

Example 4—The modular container of Examples 1, 2 or 3, wherein the valve comprises an opening and a blocking element, wherein the contents apply a pressure on the blocking element when the modular container is oriented in the second position, and wherein the blocking element is configured to block the opening in response to the contents applying the pressure.

Example 5—The modular container of Examples 1, 2, 3 or 4, wherein the port is further configured to connect to a pump configured to fill the internal cavity of the housing with an external contents, and wherein, upon activation of the pump, the vent allows an airflow comprising air particles equal to or less than the predetermined size to exit the internal cavity of the housing.

Example 6—The modular container of Examples 1, 2, 3, 4 or 5, wherein the predetermined size is less than or equal to 10 microns.

Example 7—A modular containment system is provided. The modular containment system comprises a first modular container, and a transportable cart. The first modular container comprises a port, an interlock, a housing defining an internal cavity configured to contain a contents, and a vent. The vent is configured to allow particles of a predetermined size to enter and exit the internal cavity of the housing when the first modular container is oriented in a first position, and further configured to prevent the contents from exiting the internal cavity when the first modular container is oriented in a second position. The transportable cart comprises an interlock configured to mechanically couple with the interlock of the first modular container, and a pump in fluid communication with the port of the first modular container. The pump is configured to remove the contents from the internal cavity, and further configured to fill the internal cavity with an external contents from an external source.

Example 8—The modular containment system of Example 7, wherein the transportable cart further comprises an interlock system configured to a engage with a number of separate modular components.

Example 9—The modular containment system of Examples 7 or 8, further comprising a second modular container, wherein an interlock of the second modular container is configured to mechanically couple with at least one of the interlock of the first container and the interlock of the transportable cart.

Example 10—The modular containment system of Example 9, wherein a port of the second modular container is in fluid communication with the pump, and wherein the pump is further configured to remove a second contents from an internal cavity of the second modular container.

Example 11—The modular containment system of Examples 9 or 10, wherein the pump is configured to remove the contents from the internal cavity of the first modular container at a first rate of removal, and the pump is configured to remove the second contents from the internal cavity of the second modular container at a second rate of removal. The pump is further configured to simultaneously remove the contents from the internal cavity of the first modular container and the second contents from the internal cavity of the second modular container, and the first rate of removal is equal to the second rate of removal.

Example 12—The modular containment system of Examples 9, 10 or 11, further comprising a second pump. A port of the second container is in fluid communication with the second pump, and the second pump is configured to fill an internal cavity of the second container with the external contents.

Example 13—The modular containment system of Example 12, wherein the pump is further configured to remove the contents from the internal cavity of the first modular container at a removal rate. The second pump is configured to fill the internal cavity of the second modular container at a fill rate. The pump and the second pump are each configured to operate simultaneously.

Example 14—The modular containment system of Example 13, wherein the removal rate is equal to the fill rate.

Example 15—The modular containment system of Examples 7, 8, 9, 10, 11, 12, 13 or 14, further comprising a supply of purging agent. The supply of the purging agent is configured to be in fluid communication with a filter of the external source. The purging agent is forced through the filter of the external source.

Example 16—The modular containment system of Example 15, wherein the purging agent comprises a pressurized fluid including at least one of the following: air, nitrogen and carbon dioxide.

Example 17—The modular containment system of Examples 7, 8, 9, 10, 11, 12, 13, 14, 15 or 16, further comprising a receptacle in fluid communication with the external source, wherein the receptacle is configured to receive a sample of the external contents.

Example 18—The modular containment system of Example 17, wherein the receptacle further comprises a sensor configured to detect a characteristic of the sample, and wherein the sensor is further configured to produce a signal based at least in part on the characteristic.

Example 19—The modular containment system of Example 18, further comprising a memory configured to store data, and a control circuit in signal communication with the sensor. The control circuit is configured to receive the signal produced by the sensor, compare the signal produced by the sensor to the stored data, and determine, based at least in part on the comparison, a quality of the sample stored in the receptacle.

Although the various aspects of the modular container and modular containment system have been described herein in connection with certain disclosed aspects, many modifications and variations to those aspects may be implemented. Also, where materials are disclosed for certain components, other materials may be used. Furthermore, according to various embodiments, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of a modular container and a modular containment system, the general principles of the invention are equally applicable to other types of containers and systems.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A modular container, comprising:
 a housing defining an internal cavity configured to contain a contents;
 a port configured to selectively allow the contents to enter and exit the internal cavity;
 a vent configured to allow particles of a predetermined size to enter and exit the internal cavity of the housing when the modular container is oriented in a first position, and wherein the vent is further configured to prevent the contents from exiting the internal cavity when the modular container is oriented in a second position; and
 a mechanical interlock system comprising a first interlock element comprising a first geometry and a second interlock element comprising a second geometry that is an inverse equivalent of the first geometry, wherein the first interlock element is configured to mechanically engage with a corresponding second interlock element of a separate second modular component container comprising the second geometry when the second modular container is stacked on top of the modular container, wherein the second interlock element is configured to mechanically engage with a corresponding first interlock element of a separate system component comprising the first geometry, wherein the second modular container comprises a second vent, and wherein the vent is configured to establish fluid communication with the second vent when the second modular container is stacked on top of the modular container.

2. The modular container of claim 1, wherein the port is configured to connect to a pump configured to remove the contents from the internal cavity of the housing, and wherein, upon activation of the pump, the vent allows an airflow comprising air particles equal to or less than the predetermined size into the internal cavity of the housing.

3. The modular container of claim 2, wherein the internal cavity comprises a primary chamber and a secondary chamber in fluid communication with the primary chamber, wherein the secondary chamber comprises a geometry configured to channel the contents from the primary chamber to the port.

4. The modular container of claim 1, wherein the vent comprises an opening and a blocking element, wherein the contents apply a pressure on the blocking element when the modular container is oriented in the second position, and wherein the blocking element is configured to block the opening in response to the contents applying the pressure.

5. The modular container of claim 1, wherein the port is configured to connect to a pump configured to fill the internal cavity of the housing with an external contents, and wherein, upon activation of the pump, the vent allows an airflow comprising air particles equal to or less than the predetermined size to exit the internal cavity of the housing.

6. The modular container of claim 1, wherein the predetermined size is less than or equal to 10 microns.

7. The modular container of claim 1, wherein the vent of first modular container is configured to be received by a recession of the second modular container in a location corresponding to that of the vent on the first modular container when the second modular container is stacked on top of the modular container.

8. The modular container of claim 1, wherein the separate system component comprises at least one of a transport cart, a pump, or a data acquisition unit, or combinations thereof.

* * * * *